US009472035B2

(12) United States Patent
Lin

(10) Patent No.: US 9,472,035 B2
(45) Date of Patent: Oct. 18, 2016

(54) REMOTE CONVENIENCE METHOD AND APPARATUS WITH REDUCED SIGNAL NULLS

(71) Applicant: Xing Ping Lin, West Bloomfield, MI (US)

(72) Inventor: Xing Ping Lin, West Bloomfield, MI (US)

(73) Assignee: TRW Automotive U.S. LLC, Livonia, MI (US)

(*) Notice: Subject to any disclaimer, the term of this patent is extended or adjusted under 35 U.S.C. 154(b) by 89 days.

(21) Appl. No.: 14/373,957

(22) PCT Filed: Feb. 18, 2013

(86) PCT No.: PCT/US2013/026589
§ 371 (c)(1),
(2) Date: Jul. 23, 2014

(87) PCT Pub. No.: WO2013/126305
PCT Pub. Date: Aug. 29, 2013

(65) Prior Publication Data

US 2014/0354404 A1 Dec. 4, 2014

Related U.S. Application Data

(60) Provisional application No. 61/602,141, filed on Feb. 23, 2012.

(51) Int. Cl.

| | |
|---|---|
| ***G07C 9/00*** | (2006.01) |
| ***H04B 1/18*** | (2006.01) |
| ***G08C 19/00*** | (2006.01) |
| ***B60R 25/00*** | (2013.01) |

(52) U.S. Cl.
CPC . *G07C 9/00182* (2013.01); *G07C 2009/00206* (2013.01); *G07C 2009/00769* (2013.01)

(58) Field of Classification Search
CPC .............................. G07C 9/00; G07C 9/00182
USPC .......... 340/5.72, 5.2, 5.64; 455/161.3, 161.1, 455/277.1, 101; 343/711
See application file for complete search history.

(56) References Cited

U.S. PATENT DOCUMENTS

| | | | | |
|---|---|---|---|---|
| 4,069,472 A | | 1/1978 | Kamata et al. | |
| 4,566,133 A | * | 1/1986 | Rambo ................ | H04B 7/0814 455/277.2 |
| 4,978,963 A | * | 12/1990 | Thorpe ..................... | G01S 3/48 342/433 |

(Continued)

OTHER PUBLICATIONS

PCT/US2013/026589 International Search Report and Written Opinion, completed Apr. 3, 2013.

*Primary Examiner* — Nam V Nguyen
(74) *Attorney, Agent, or Firm* — Tarolli, Sundheim, Covell & Tummino LLP

(57) ABSTRACT

A vehicle control system is described including radio-frequency receiver. The receiver includes an antenna input adapted for connection to an antenna for receiving radio frequency signals, a source of at least a first local oscillator frequency and a second local oscillator frequency, a demodulator for demodulating the signal received via the antenna input with the first local oscillator frequency to generate a first demodulated signal and, separately, for demodulating the signal received via the antenna input with the second local oscillator frequency to generate a second demodulated signal, and a control circuit that evaluates the first and second demodulated signals according to at least one criterion and utilizes for control purposes whichever of the demodulated signals is better, according to that criterion.

22 Claims, 4 Drawing Sheets

(56) References Cited

U.S. PATENT DOCUMENTS 5,710,995 A * 1/1998 Akaiwa ................ H04B 7/0874 375/347
6,532,359 B1 * 3/2003 Lin ........................ H04B 1/202 455/101
8,319,605 B2 * 11/2012 Hassan .................. G01C 17/38 340/10.2
8,380,430 B2 * 2/2013 Malone ................... B60R 25/24 701/431
2004/0127180 A1 * 7/2004 Burke ...................... H04B 1/16 455/161.3
2006/0164210 A1 7/2006 Ikeo
2008/0020723 A1 1/2008 Rabinovich et al.
2008/0088409 A1 4/2008 Okada et al.
2010/0305779 A1 12/2010 Hassan et al.

* cited by examiner

REMOTE CONVENIENCE METHOD AND APPARATUS WITH REDUCED SIGNAL NULLS

The present invention relates to remote convenience systems, and is particularly directed to a remote convenience method and apparatus that extends the range of operation of the system by reducing signal nulls.

BACKGROUND

Remote convenience systems are known in the art. One example type of a remote convenience system, known as a remote keyless entry ("RKE") system, is designed to remotely lock and unlock doors of a vehicle such as a passenger car, SUV, or truck. An RKE system may also control other vehicle functions, such as remote start of the vehicle (useful in areas having cold winter weather), and horn chirp and light flashing (useful for finding your vehicle in a large and crowded parking area). An RKE system will typically include a small portable transmitter, referred to as a fob, carried by the vehicle operator, and a radio receiver installed in the vehicle. Pressing a button on the fob causes the fob to transmit a corresponding coded radio frequency ("RF") command to the receiver. The receiver decodes the commands and controls vehicle systems so as to complete the commanded action.

It is helpful if the range of the RKE system is rather long so that certain functions (e.g. "remote start" and "vehicle locator" functions) can be initiated from a relatively long distance from the vehicle. U.S. Pat. No. 6,472,999 to Lin describes an RKE system that performs some functions at long distance, and others functions only at much shorter distances.

The range of operation of an RKE system is limited by the power of the RF signal generated by the transmitter in the fob, as well as by the quality of the communication path between the fob and the vehicle. Obstructions (particularly metal obstructions) within the vicinity of the communication path may attenuate the transmitted signal or create so-called 'multipath' reflections, either of which may diminish range of operation of the system.

SUMMARY OF THE INVENTION

In accordance with one aspect of the present invention, apparatus is provided for use in a vehicle convenience system. The apparatus includes a radio-frequency receiver having an antenna input adapted for connection to an antenna for receiving radio frequency signals, and includes a source of at least a first local oscillator frequency and a second local oscillator frequency, as well as a demodulator and a control circuit. The demodulator demodulates the signal received via the antenna input with the first local oscillator frequency to generate a first demodulated signal and, separately, demodulates the signal received via the antenna with the second local oscillator frequency to generate a second demodulated signal. The control circuit evaluates the first and second demodulated signals according to at least one criterion and, responsive to the evaluation, utilizes for control purposes one of the first and second demodulated signals.

In accordance with another aspect of the present invention the apparatus also includes a radio-frequency transmitter for use in connection with the receiver. The transmitter transmits an RE message modulated on a first carrier frequency, and also transmits an RF message modulated on a second carrier frequency.

In accordance with yet another aspect of the present invention, a method is provided for reducing signal nulls in vehicle control systems. The method includes the steps of transmitting a first signal at a first frequency and transmitting a second signal at a second, different frequency, receiving the first signal and the second signal, evaluating the received signals according to at least one criterion related to signal quality, and, in response to the evaluation, utilizing at least one of the first or second received signals to operate a vehicle convenience system.

In accordance with a further aspect of the present invention, apparatus is provided for use in a vehicle control system. A battery-powered radio transmitter transmits vehicle control messages on first and second radio frequencies separated from one another by selected frequency difference. An antenna is adapted for mounting on a vehicle, the antenna having a radiation pattern with signal nulls at different locations at the first and second radio frequencies. A receiver is adapted for mounting on a vehicle and is connected to the antenna for receiving radio frequency signals therefrom. The receiver includes a demodulator for demodulating the signal transmitted by the transmitter on the first radio frequency and the signal transmitted by the transmitter on the second radio frequency to thereby generate respective first and second demodulated signals. The receiver further includes a control circuit for controlling at least one vehicle system. The control circuit evaluates the first and second demodulated signals according to at least one criterion and utilizes for control purposes whichever of the signals is better quality, according to that criterion.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
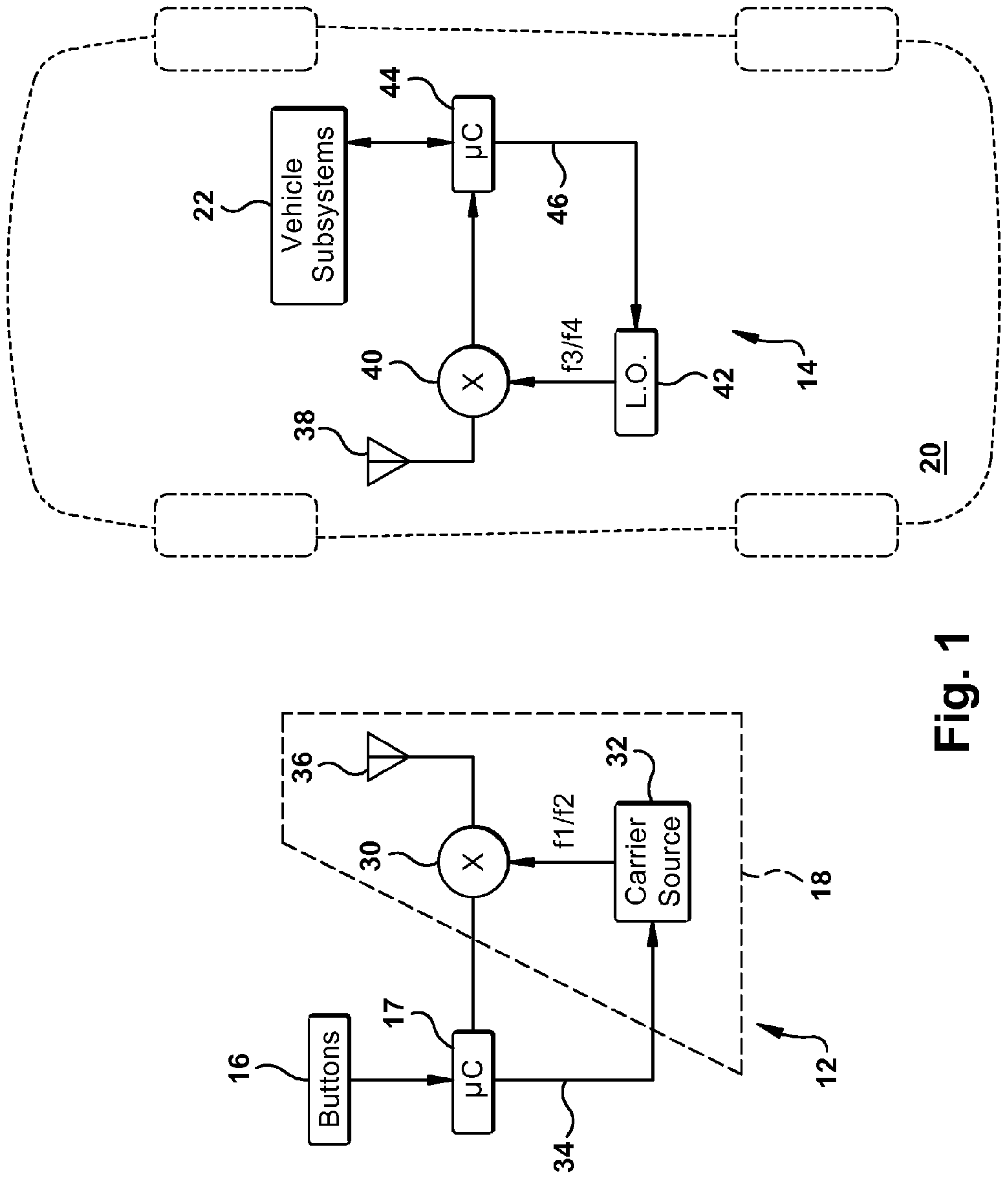
FIG. 1 is a block diagram of a remote keyless entry system according to one example embodiment of the present invention.

Referring to FIG. 1, a remote keyless entry system ("RKE") is shown at 10 including a transmitter fob 12 and a receiver 14. The transmitter fob 12 is small, battery powered, and portable, and is designed and intended for convenient carrying in the hand, or in a pocket or purse, of the vehicle operator. The fob 12 carries several manually operable push buttons 16 for controlling such vehicle functions as door lock and unlock, panic, and remote start. The fob 12 further includes a controller 17 for responding to a button press to create a secure message for transmission to the vehicle, and a transmitter 18 for transmitting the secure digital message. The controller 17 may take the form of a programmable microcontroller or a state machine of generally conventional architecture. Typically the microcontroller will be integrated into a single, application specific integrated circuit ("ASIC")

The receiver 14 is mounted on a vehicle 20, and is connected to various vehicle subsystems 22, such as electric door locks, horn, and engine controls. When the operator presses a push button 16 on the fob 12, the controller 17 causes the transmitter 18 to broadcast a corresponding secure coded digital message to the receiver 14. The receiver 14 decodes the message and causes the subsystems 22 to perform the function associated with the fob button pressed by the operator.

Some RKE functions, e.g. remote start, door lock, or horn chirp, are desirably operable from long range. Further, vehicle operators expect their RKE system to exhibit a reasonably consistent range of operation at all locations around the vehicle. However, due to multipath reflections and signal attenuation caused by structure obstructions (both internal structures within the vehicle 20 and external structures in the vicinity of the vehicle 20), as well as directionality of the antenna associated with the receiver 14, there will inevitably be signal null locations around the vehicle. These null locations occur at particular angular locations around the vehicle depending on the vehicle structure and surroundings. Therefore, the null locations are referred to as "null angles." At particular null angles about the vehicle, the signal reception will be impaired and thus the RKE system will exhibit a shorter range of operation.

When an RE signal is broadcast by the fob, the paths of the reflection/diffraction signals bounced from surrounding structure and through the vehicle to the receiving antenna will depend upon the wavelength of the RF signal. Thus, for a given vehicle design and location, the far field radiation pattern of the vehicular antenna will vary with the wavelength of the signal being received. In particular, the null angle of an antenna operating at one frequency will be different from the null angle at a different frequency.

Figure 2B:
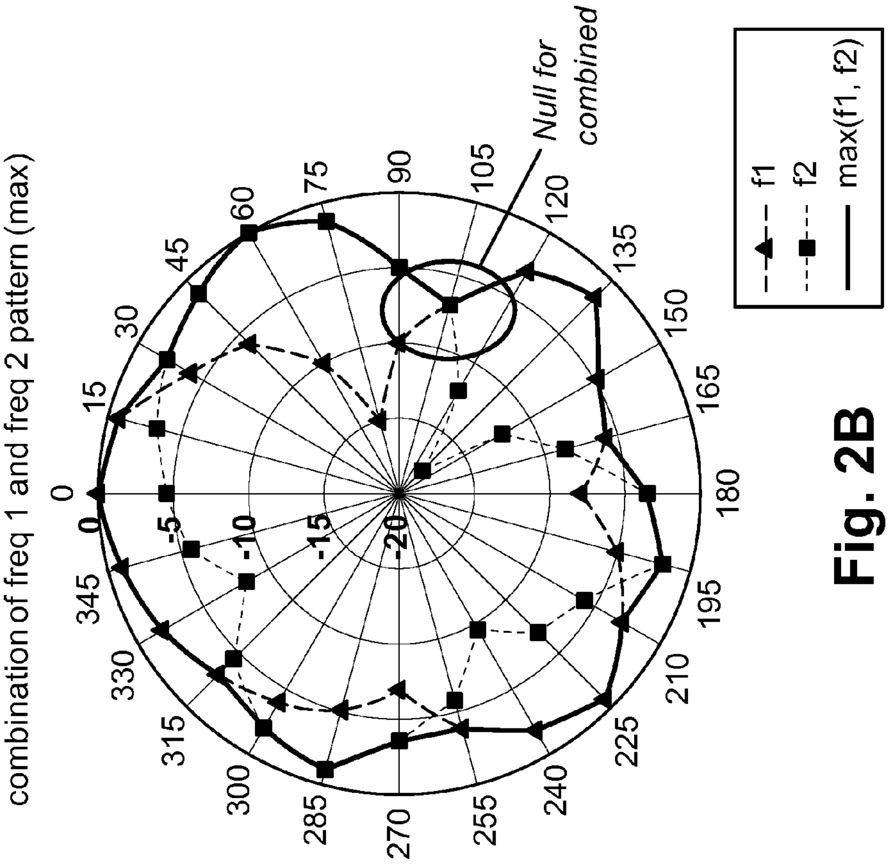
FIGS. 2(*a*) and 2(*b*) are antenna patterns for the receiver of FIG. 1 at the two carrier frequencies used by the transmitter of FIG. 1.

According to the present invention, this frequency dependence is exploited to overcome the range inconsistency arising from the signal nulls. Two operating frequencies f1 and f2 are chosen so that the radiation patterns of the vehicular antenna, at those two frequencies, are different. Because the difference in the radiation patterns will be small if the two frequencies are close, f1 and f2 are preferably chosen so that the difference between the frequencies is sufficient to provide the desired different radiation patterns so as to reduce null effects. Specifically, the frequency difference will be chosen to be large enough that the nulls associated with the two frequencies will be found at different angular locations around the vehicle, as shown in FIG. 2. In accordance with one example embodiment, a frequency of 315 MHz is chosen as f1 and a frequency of 434 MHz is chosen as f2, a difference in frequency of greater than 25%. Different frequencies may be chosen for f1 and f2, but of course the frequencies chosen must each lie within the frequency bands allotted by the Federal Communication Commission ("FCC") for RKE use.

The transmitter 18 includes a modulator 30 and a carrier source 32. The carrier source 32 is designed to provide carrier frequency f1, or carrier frequency f2, as selected by controller 17 via control line 34. The carrier source 32 may take any of a variety of forms. It may, for example, comprise two switchable crystal-controlled oscillators, or a single oscillator either (a) with switchable impedance or filter (e.g. SAW filter) elements or (b) with a fixed frequency oscillator and a controllable frequency divider.

The carrier frequency of the transmitted secure coded digital message will match the frequency of the carrier frequency source. In the presently described embodiment of the invention, the modulator 30 is an amplitude-shift-keyed ("ASK") modulator that amplitude modulates (typically, keys on and off) the carrier according to the content of the secure coded digital message. The resulting modulated RF signal is coupled to, and broadcast by, antenna 36. The invention would apply equally to a system using another type of modulation, such a frequency-shift-keyed ("FSK") modulation.

The controller 17, in accordance with one example embodiment, is programmed so that, for each button actuation, the same secure digital message will be sent to the transmitter 18, and thereby transmitted, four times in succession. For the first two transmissions, controller 17 will cause carrier source 32 to supply carrier f1 and, for the last two transmissions, controller 17 will cause carrier source 32 to supply carrier f2. Thus the same message will be sent twice upon carrier frequency f1, and twice upon carrier frequency f2. The timing of the transmissions is illustrated in FIG. 4.

Figure 4:
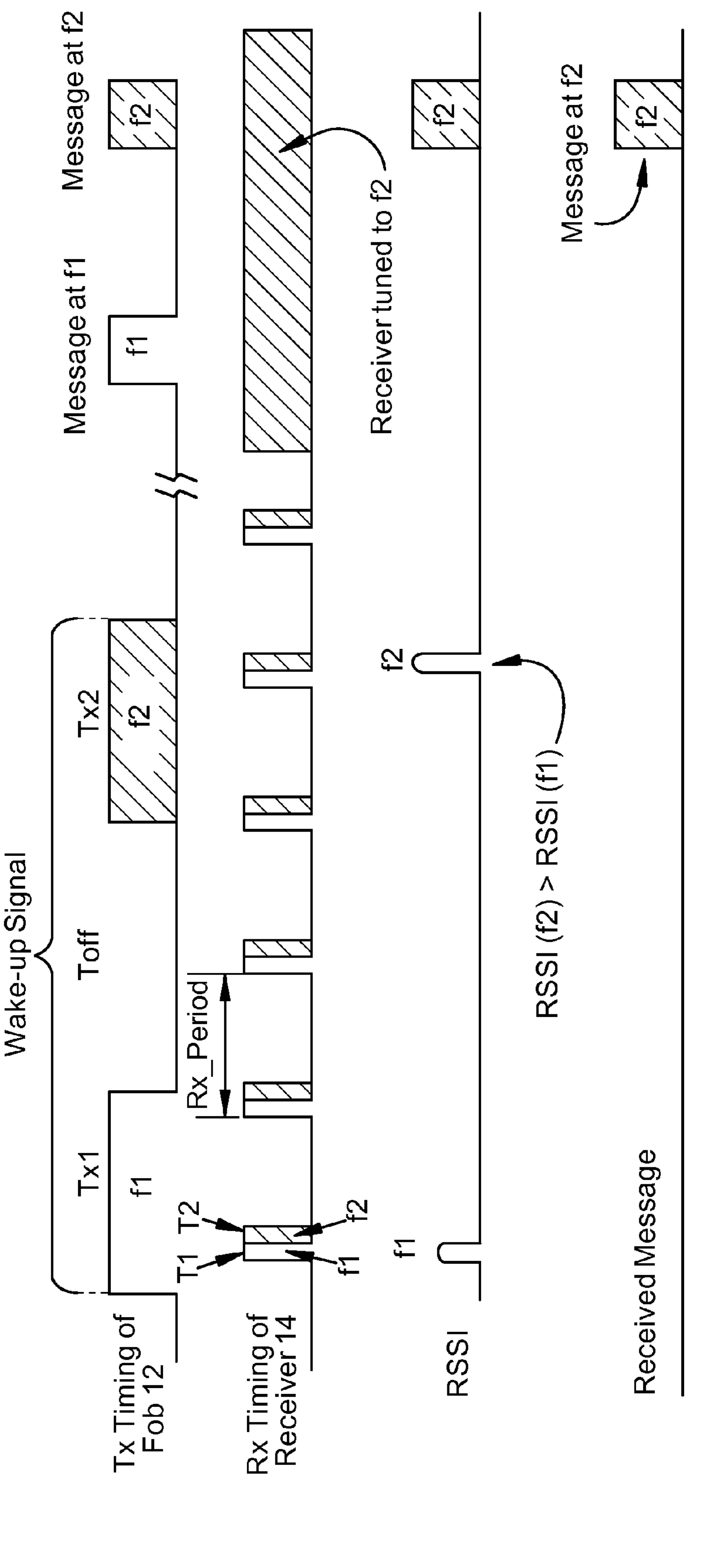
FIG. 4 are timing diagrams useful in understanding the sequence of operation of the transmitter and receiver of FIG. 1.

In the example illustrated in FIG. 4, the message transmissions are preceded by a wake-up signal, where the wake-up signal is employed to simplify the process of detecting the optimal communication frequency. The fob 12 generates the wake-up signal by transmitting a repeating basic signal (e.g., all '1's or alternating '1's and '0's) at frequency f1 for time interval Tx1, then pausing for period Toff, then transmitting the same basic signal at frequency f2 for time interval Tx2. The timing of the parts of the wake up signal are not shown to scale in FIG. 4, and may for example be 22 milliseconds ("ms") each for Tx1 and Tx2, and 78 ms for Toff. Following the wake-up signal, the four messages will be transmitted by fob 12. For simplicity, only one of the messages at each frequency f1 and f2 is shown in FIG. 4 but, as stated previously, the message will be transmitted twice (or more) at each frequency, following the wake-up signal.

A receiver inside the vehicle is equipped to receive both sets of messages. An antenna 38 receives the RF signal broadcast by antenna 36, and supplies the resulting signal to a demodulator 40. A local oscillator ("LO") signal from a local oscillator 42 is also provided to demodulator 40, which beats the received RF signal against the LO signal. The resulting intermediate frequency ("IF") signal, which could be a frequency of zero where the demodulator is a direct demodulator, is filtered and otherwise processed within the demodulator to provide a baseband signal to the controller 44 for decoding and subsequent control of the vehicle subsystems 22. In the presently described example embodiment, the controller 44 is a programmed microcomputer.

The local oscillator 42 is designed to provide an LO signal of frequency f3, or an LO signal of frequency f4, as selected by controller 44 via control line 46. The frequencies f3 and f4 are displaced from the frequencies f1 and f2 by an amount equal to the chosen IF frequency whereby received signals on frequency f1 may be demodulated when LO frequency f3 is chosen, and signals on frequency f2 are demodulated when LO frequency f4 is chosen. The local oscillator 42 may take any of the designs previously discussed with respect to carrier source 32.

Controller 44, under program control, will cause local oscillator 42 to provide LO frequency f3 for some preset interval T1. Controller 44 will thereafter cause local oscillator 42 to provide LO frequency f4 for an interval T2, preferably equal to T1. Controller 44, again under program control, will cause local oscillator 42 to continue to alternate LO frequencies f3 and 14 in this manner (with a period shown as "Rx period" in FIG. 4) as long as receiver 14 is listening for messages. In essence, receiver 14 polls for the wake-up signal at frequency f1 and alternately at frequency f2. This is illustrated in the second timing line of FIG. 4, where T1 and T2 are shown as being 1 ms each, and the Rx period is shown as 20 ms.

Demodulator 40 includes circuitry for measuring, either autonomously or under control of controller 44, the signal strength of the received signal during the polling process. The received signal strength measurement may be generated in any conventional fashion and may, for example, be generated as described in the aforementioned prior U.S. Pat. No. 6,472,999, which is hereby fully incorporated herein. The resulting received signal strength indication ("RSSI") is provided to controller 44 for evaluation. The controller 44 uses the RSSI as a measure of the quality of the wake-up signal received from the fob 12, and adopts and responds to the frequency having the higher message quality. Thus, the communication system as a whole chooses whichever set of messages, those modulated upon frequency f1 or those modulated upon frequency f2, displays the highest RSSI under the then-extant circumstances. In the example of FIG. 4, the third timing line shows the measured RSSI determined by the demodulator. In the figure, the RSSI of the signal at f2 is greater than the RSSI of the signal at f1, whereby the receiver will be tuned to f2 (LO frequency set to f4) to receive the data messages broadcast by fob 12 on frequency f2.

Figure 2A:
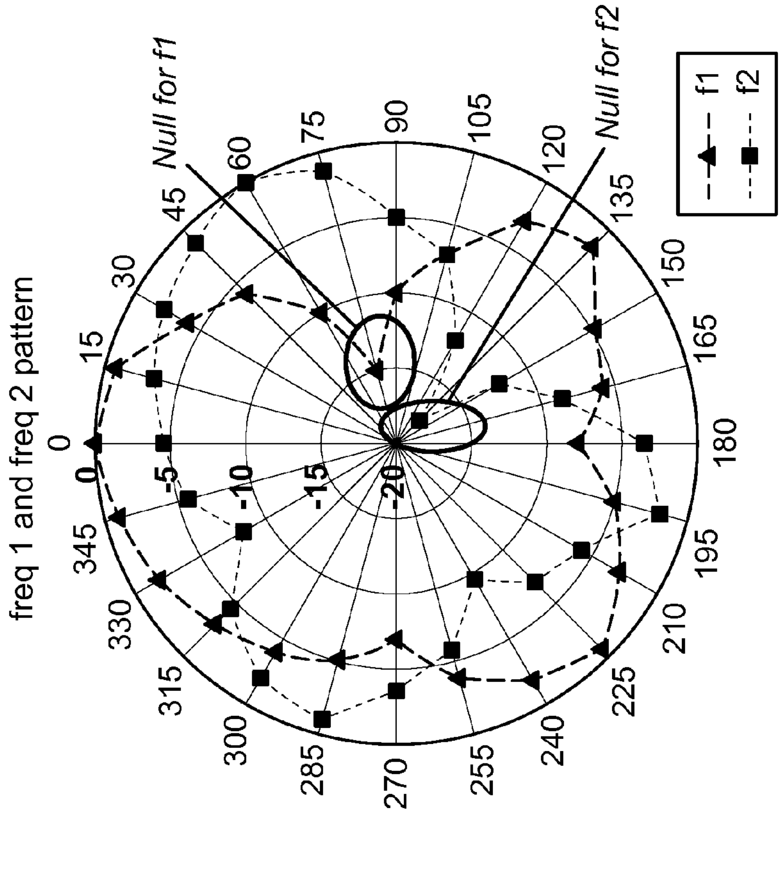

FIG. 2*a* shows simulated radiation patterns of the vehicle antenna 38 for frequencies f1 and f2 (315 MHz and 434 MHz in the described embodiment) about a vehicle in a particular environment. The antenna 38, which is considered to rest at the center of the pattern, is treated as mounted at the rear of a vehicle in this simulation. The pattern is shown for all directions around the vehicle, because the fob could be located at any angle around the vehicle when it is actuated. As shown in the figure, the f1 and f2 patterns have nulls less than −15 dB. After applying the described frequency diversity system (select the stronger signal at any time/angle): the new combined (frequency diversity) radiation pattern is plotted in FIG. 2*b*. The lowest null is now −9 dB only, and the system null has thus been improved in this simulated system at least by 6 dB over the 315 MHz pattern and more than 20 dB over 434 Mhz pattern.

Figure 3:
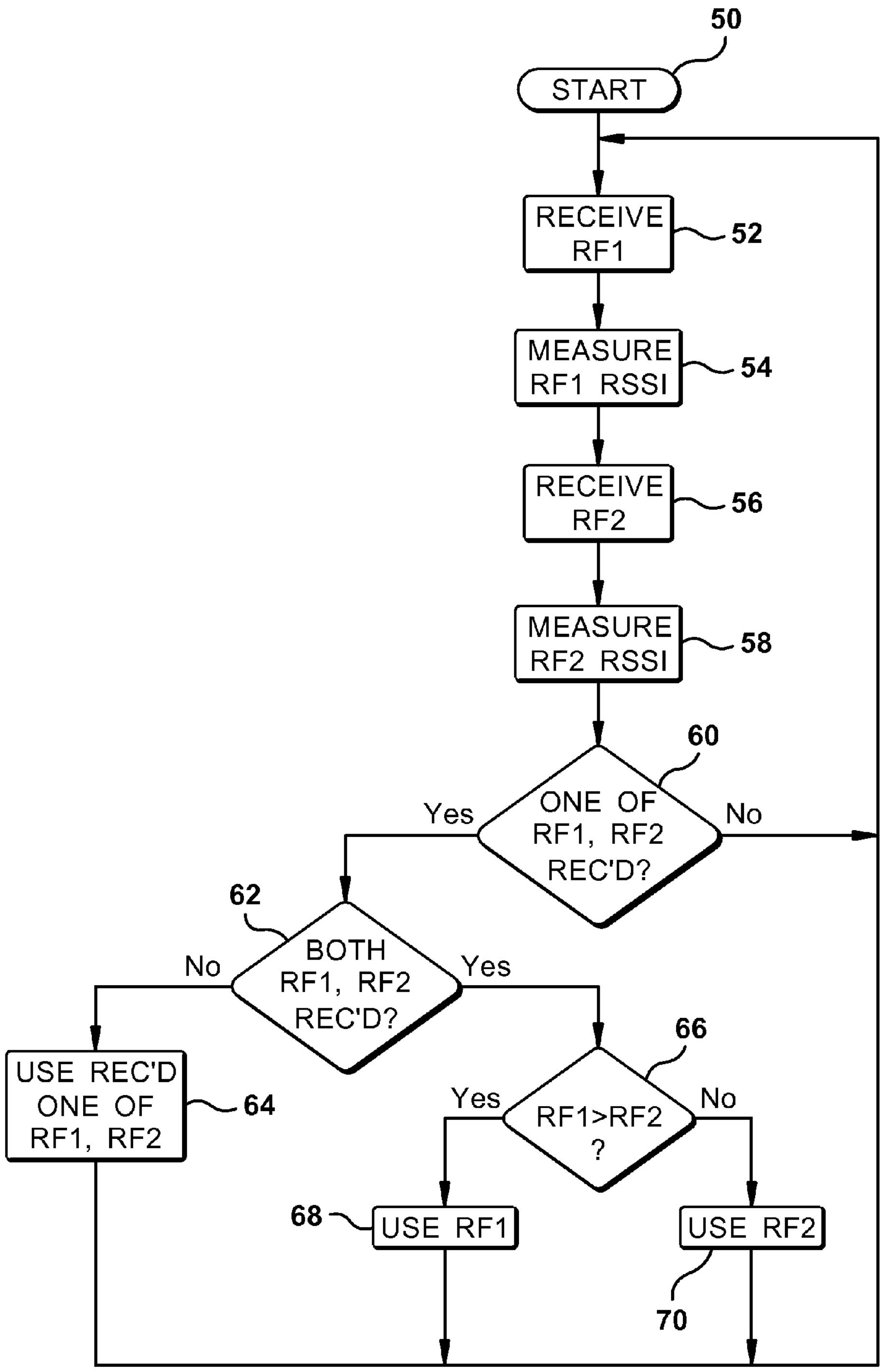
FIG. 3 is a flow chart showing a control process in accordance with an example embodiment of the present invention.

FIG. 3 is a flow chart depicting a control process in accordance with an example embodiment of the present invention that reduces null angles in an RKE system. This flow chart follows the process that has been generally described above, and will be most easily understood in conjunction with the timing diagram of FIG. 4. The process is performed by controller 44 (FIG. 1, in this case a microcomputer and associated peripheral circuitry) under the control of software stored within the nonvolatile memory that forms part of controller 44. The program shown in FIG. 3 is cyclical, and the microcomputer within controller 44 will continue to perform the steps in the cycle as long as the battery is connected to the receiver. Of course, the process may be interrupted periodically or for specific intervals as desired to conform to energy savings protocols implemented in the vehicle. For example, when the ignition is off, delays may be introduced into the cycle so that the cycle performs less frequently.

In FIG. 3, the initialization operations performed by the microcomputer at startup are indicated generally at step 50.

These steps include initialization of timers, counters, registers, and so on. Process flow then moves to the main loop, where at step 52 microcomputer 44 sets local oscillator 42 to provide LO frequency f3 for some preset interval T1. In step 54, Controller 44 monitors the output of demodulator 40 (at this time, "RF1"), processing the demodulated signal and measuring the signal strength of the demodulated signal (the 'received signal strength intensity', or "RSSI" of RF1). At the conclusion of the T1 interval, controller 44 stores the resulting measured RSSI in memory. If the RSSI is below a noise threshold, however, then controller 44 instead stores a null reading ("0") in memory. In step 56 controller 44 sets local oscillator 42 to provide LO frequency f4 for an interval T2, preferably equal to T1. The step 58 which follows is similar in content to step 54, in that the demodulated signal (now "RF2") is monitored for the presence of the wake-up signal, the RSSI measured, and, at the conclusion of interval T2, the resulting measured RSSI is stored in memory.

Following the activities in step 58, the controller 44 at step 60 conditionally jumps back to step 52 if no wake-up signal was detected at RF1 or RF2 (i.e., the measured RSSI was below a noise threshold at both frequencies). Before repeating the process at step 52, however, the controller 44 will pause for some dwell time, which is 18 ms in the illustrated example.

If at least one message was detected, however (i.e., the RSSI was above the noise threshold at least at one of the polled frequencies), then program flow proceeds to another conditional in step 62. If it is determined in step 62 that only one valid wake-up signal was received, program flow continues to step 64 where that valid wake-up signal is acted upon. In step 64, the receiver is tuned to the frequency at which the valid wake-up signal was received, and the receiver awaits a valid data message from the fob 12 at that frequency. If a valid message is thereupon received (check sum correct, transmitter ID code correct, etc.) the resulting validated vehicle command contained in the message (e.g., a vehicle door lock or unlock command) is implemented by controller 44. The implementation of the command is accomplished in any conventional manner. For example, the controller 44 may send a suitable door lock control message to a vehicle "body control module" via a wired vehicle communication bus, e.g. a so-called "CAN" bus. The body control module will in turn operate the door lock in accordance with the command.

If it is determined in step 62, however, that valid wake-up signals were received both at RF1 and RF2, then program flow instead branches to step 66. In step 66, the RSSIs of RF1 and RF2 are compared, with that frequency subsequently being used whose RSSI was greater. If the RSSI of RF1 was greater than the RSSI of RF2, then program flow continues to step 68 where the receiver is tuned to f1 (LO set to f3) and the fob message is received at that frequency and the encoded vehicle command is implemented. If, on the other hand, the RSSI of RF1 is not greater than the RSSI of RF2 (meaning that the RSSI of RF2 is as great as, or greater than, the RSSI of RF2), then program flow continues to step 70 where the receiver is tuned to f2 (LO set to f4) and the fob message is received at that frequency and the encoded vehicle command implemented. The command receipt and implementation steps 68 and 70 are similar in content to step 64, except with respect to the frequency to which the receiver is tuned during receipt of the message.

After each of steps 64, 68, and 70, program flow reverts to the beginning of the cycle at step 52, whereupon, again under program control, receiver 14 will revert to the polling process and continue to alternate LO frequencies f3 and f4 as long as receiver 14 is listening for messages.

Various other embodiments are contemplated that may further improve performance of the system. For example, the antenna 38 could be a single antenna, as illustrated, with or without special tuning for each carrier frequency f1 and f2, or could instead be two or more separate antennae. If two antennae are provided, they will preferably be separated from one another physically by a certain distance and/or will have different polarizations. Such antenna diversity will overcome shadows directly caused by the vehicle structure behind the receiving antenna, and will also mitigate some RF fading. However, physical separation of the antennae will increase the size of the receiver or require that one antenna be mounted remote from the rest of the receiver. Sometime, this is not desired. Thus, the design choice will depend upon other system design constraints.

The described frequency diversity concept can also be applied to the other vehicle systems relying upon RF communications links such as, e.g., tire pressure monitor ("TPM") systems. In a TPM system using the present concepts, the sensor inside the tire will transmit two frequencies and a receiver inside the vehicle will receive the two frequencies, measure signal quality via RSSI or some other criteria, and then use the higher quality signal. In response to the received message, the receiver will control a driver alert device, typically a warning light, according to the inflation state of the tires.

In the described embodiment only two frequencies are used, but the present invention is not limited to two frequencies. Frequency diversity systems using more than two frequencies can be constructed with the same principles described above.

From the above description of the invention, those skilled in the art will perceive improvements, changes and modifications. For example, the present invention has been described with reference to an RKE system. The invention is also applicable to other transmitter/receiver system such as tire pressure monitor system, other security systems such as home security systems, etc. Other measures of signal quality may be used instead of RSSI such as, e.g., data error rates or signal amplitude or frequency variability. Instead of using wake-up signals in the described manner, the messages may be received at each frequency and the signal quality measured directly from those received messages. Such improvements, changes and modifications within the skill of the art are intended to be covered by the appended claims.

Having described the invention, the following is claimed:

1. Apparatus for use in a vehicle convenience system comprising:

a receiver adapted for mounting on a vehicle, said receiver including an antenna input adapted for connection to an antenna for receiving radio frequency signals, a source of at least a first local oscillator frequency and a second local oscillator frequency separated by a difference large enough that nulls associated with the first and second frequencies are found at different angular locations around the vehicle, a demodulator for demodulating the signal received via said antenna input with said first local oscillator frequency to generate a first demodulated signal and, separately, for demodulating the signal received via said antenna input with said second local oscillator frequency to generate a second demodulated signal, and a control circuit for controlling at least one vehicle system, said control circuit evaluating the first and second demodulated signals according to at least one criterion and, responsive to said evaluation, utilizing for control purposes one of said first and second demodulated signals.

2. Apparatus as set forth in claim 1, wherein said control circuit includes a circuit for measuring the quality of each of said first and second demodulated signals, and wherein said control circuit utilizes for control purposes the one of said first and second demodulated signals having the highest quality.

3. Apparatus as set forth in claim 2, wherein said circuit for measuring quality comprises a circuit for measuring the received signal strength of each of said first and second demodulated signals, and wherein said control circuit utilizes for control purposes the one of said first and second demodulated signals having the highest received signal strength.

4. Apparatus as set forth in claim 1, and further comprising a radio antenna adapted for receiving all of the signals to be demodulated by said demodulator, said radio antenna being coupled to said antenna input.

5. Apparatus as set forth in claim 4, and further comprising two radio antennae adapted for receiving said first and second signals, respectively, to be demodulated by said demodulator, said control circuit including a circuit for selectively coupling each said radio antennae to said demodulator to generate respective ones of said first and second demodulated signals.

6. Apparatus as set forth in claim 1, wherein said receiver is operatively coupled to at least one vehicle door lock, and wherein said control circuit controls said at least one vehicle door lock in response to at least one of said first and second demodulated signals.

7. Apparatus as set forth in claim 1, further comprising a remote, portable, battery operated radio transmitter for transmitting messages to said receiver on first and second frequencies, and at least one antenna coupled to said antenna input of said receiver and adapted for receiving said messages on said first and second frequencies, wherein said demodulator of said receiver demodulates said message on said first frequency with said first local oscillator frequency to generate a first demodulated signal and, separately, demodulates said message on said second frequency with said second local oscillator frequency to generate a second demodulated signal.

8. Apparatus as set forth in claim 7, wherein said transmitter first transmits a message to said receiver on said first frequency and then transmits substantially the same message to said receiver on said second frequency.

9. Apparatus as set forth in claim 7, wherein said first and second frequencies are separated by at least 25% of the frequency of one of said first and second frequencies.

10. Apparatus as set forth in claim 7, wherein said first frequency is 315 MHz and said second frequency is 434 MHz.

11. A method for reducing signal nulls in a convenience system for a vehicle comprising the steps of:

transmitting a first signal at a first frequency and transmitting a second signal at a second frequency separated from said first frequency by a difference large enough that nulls associated with the first and second frequencies are found at different angular locations around the vehicle;

receiving the first signal and the second signal;

evaluating the received first and second signals according to at least one criterion related to signal quality; and, in response to the evaluation, utilizing at least one of the first or second received signals to operate a vehicle convenience system.

12. A method as set forth in claim 11, wherein said step of evaluating the received first and second signals comprises the step of measuring the received signal strength of each of said first and second signals.

13. A method as set forth in claim 12, wherein said step of measuring the received signal strength of each of said first and second signals comprises the steps of beating each of said first and second signals against respective first and second local oscillator signals to create respective first and second demodulated signals having a common demodulated frequency range, and measuring the signal strength of each of said first and second demodulated signals.

14. A method as set forth in claim 11, wherein said step of transmitting comprises the step of transmitting a first signal at a first frequency and transmitting a second signal at a second frequency that is at least 25% greater than said first frequency.

15. A method as set forth in claim 11, wherein said step of transmitting comprises the step of transmitting a first signal modulated at 315 MHz and transmitting a second signal modulated at 435 MHz.

16. A method as set forth in claim 11, wherein said step of transmitting includes the step of transmitting a vehicle lock control message from a location remote from the vehicle, and the step of utilizing comprises the step of, in response to said evaluation, controlling a vehicle lock in accordance with at least one of the first or second received signals.

17. A method as set forth in claim 11, wherein said step of transmitting a first signal at a first frequency and transmitting a second signal at a second, different frequency comprises the steps of manually initiating transmissions at said remote location and, upon each such manual initiation of transmissions, assembling a message for transmission, and transmitting said message modulated first upon said first frequency and then upon said second frequency.

18. A method as set forth in claim 17, wherein said step of utilizing comprises the step of recovering said message from at least one of the first or second received signal and controlling a vehicle lock in accordance with said message.

19. Apparatus for use in a vehicle control system comprising:

a battery-powered radio transmitter transmitting vehicle control messages on first and second radio frequencies separated from one another by a frequency difference large enough that nulls associated with the first and second frequencies are found at different angular locations around the vehicle;

at least one antenna adapted for mounting on a vehicle, said antenna having a radiation pattern with said signal nulls at different locations at said first and second radio frequencies; and a receiver adapted for mounting on a vehicle and connected to said at least one antenna for receiving radio frequency signals therefrom, said receiver including a demodulator for demodulating the signal transmitted by said transmitter on said first radio frequency and the signal transmitted by said transmitter on said second radio frequency to thereby generate respective first and second demodulated signals, and a control circuit for controlling at least one vehicle system, said control circuit evaluating the first and second demodulated signals according to at least one criterion and utilizing for control purposes whichever of said signals is better quality, according to said at least one criterion.

20. Apparatus as set forth in claim 19, wherein said control circuit uses received signal strength as said criterion.

21. Apparatus as set forth in claim 19, wherein said selected frequency difference is at least 25% of the lower of said first and second radio frequencies.

22. Apparatus as set forth in claim 19, wherein said control circuit controls at least one of a vehicle lock and a driver alert for low tire pressure.

* * * * *